May 1, 1934.  C. J. P. SMALL  1,956,733
DRIVING MECHANISM
Filed April 30, 1931
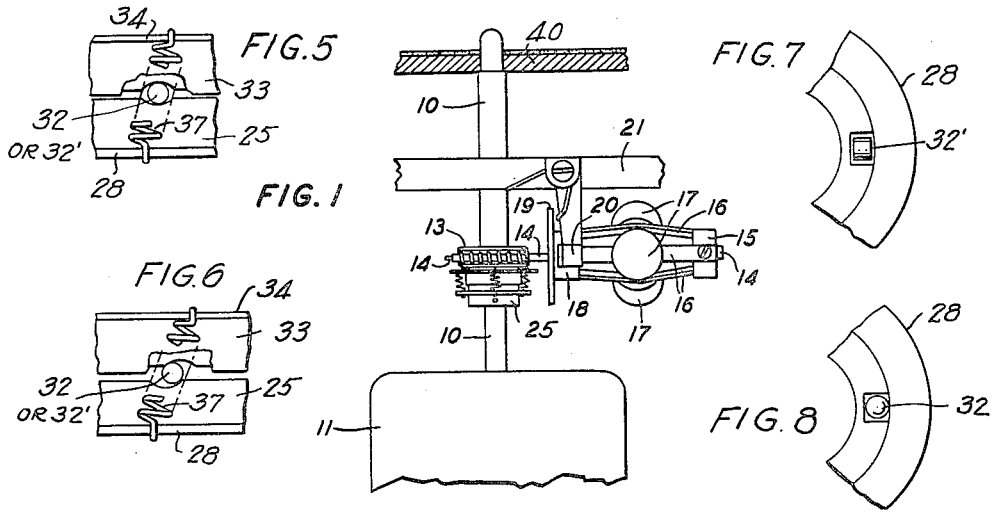
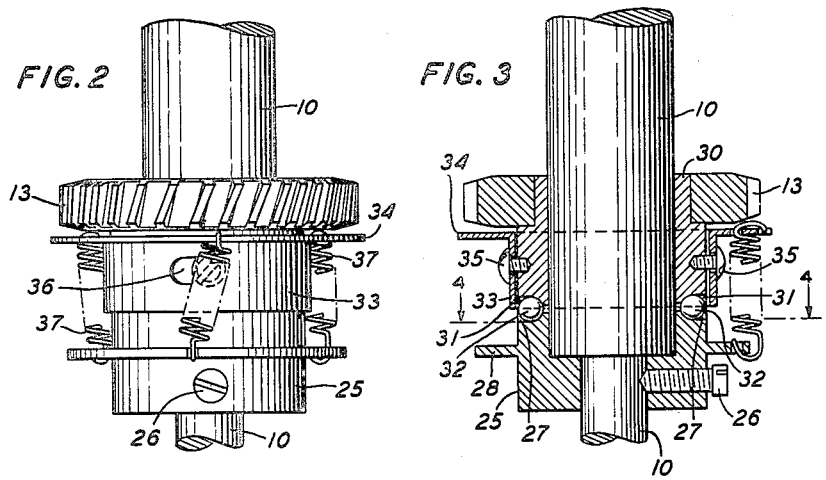
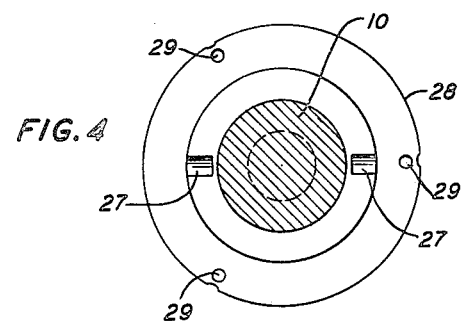
INVENTOR
C. J. P. SMALL
BY
G. H. Heydt
ATTORNEY Patented May 1, 1934

1,956,733

UNITED STATES PATENT OFFICE 1,956,733

DRIVING MECHANISM

Charles John Percival Small, Aldwych, London, England, assignor to Electrical Research Products Inc., New York, N. Y., a corporation of Delaware Application April 30, 1931, Serial No. 534,104
In Great Britain May 6, 1930

2 Claims. (Cl. 64—109)

This invention relates to speed regulation of motors, such, for example, as are used to drive sound recording or reproducing devices.

It has been found that such motors even when equipped with governors are liable to variations of speed generally small variations over short periods of time and sometimes of a periodic nature. Such speed variations have been evident in motors which are geared generally by a worm wheel driving a worm to a centrifugal governor which imposed a frictional load upon the worm and thus upon the motor.

The object of this invention is, therefore, to provide a non-linear elastic or yielding coupling between a motor drive and a centrifugal operated frictional governor of such character that the ratio of force to relative displacement between the two parts of the coupling increases with increased displacement.

With a coupling arranged in this fashion the resistance to relative motion of the two parts is relatively small providing that the motion is small. On the other hand the resistance to relative motion increases rapidly as the amplitude of the relative motion increases.

The coupling may comprise two relatively movable opposed members biased toward one another by spring connections and having corresponding curved recesses in opposed faces. A plurality of balls or rollers having a curvature less than that of the recesses are located in said recesses.

The manner in which the resistance to relative motion increases with the displacement from normal relative position of the two parts is determined by the shape of the two recesses and the relation between radius of curvature of the two recesses and the ball or roller. The recesses are elongated circumferentially. When the rollers are pressed against the inclined portion of the recesses a smooth resisting action takes place. If the rollers are forced up the inclined portions of the recesses it is obvious that since one coupling section is rigidly connected to the shaft and the other freely journaled thereon, the space between the coupling members is increased and consequently the stiffness of the springs is increased. This device not only provides an arrangement in which the resistance to relative motion increases with the displacement but provides an arrangement for smoothly governing the extent of movement of the opposed members.

The movable members may have coaxial flanges or faces and the recesses may be formed therein remote from the axis. The movable members may be constrained toward one another by tensioned springs arranged around their peripheries.

When the drive to be transmitted between the two members is in one direction only the radius of curvature of the recesses is preferably made considerably larger than that of the ball or roller. The initial constraint at the zero relative displacement is thus very small. The initial or normal torque is to a large extent transmitted by springs connected between the two members arranged to have a torsional elasticity. For example springs connected at various points around the peripheries of the two members may be arranged to make a small angle with the axis of the coupling when the latter is transmitting a normal torque. These springs transmit this torque without the ball or roller being appreciably forced up the inclined surfaces of the recesses.

Considering the mechanism as a whole including opposed members, springs, recesses and rollers, particular interest resides in the torque versus relative angular displacement. The springs taken alone have a linear stiffness. However, when taken in combination with the members and the angular movement thereof and with the recesses and rollers and the action thereof, a non-linear stiffness or elasticity is produced. In a device of this character for absorbing irregularities of motion, a reduction in angular motion in response to a given force is very important. It is apparent that in a filter having non-linear elasticity, less angular motion is produced by a force and thus less reaction to said force than would be the case with linear elasticity. A further advantage obtained with non-linear elasticity is in the reduction of the maximum velocity of an oscillation and a reduction in the variation of velocity through the period of an oscillation.

For a better understanding of the invention one embodiment thereof will be described with reference to the accompanying drawing in which:

Fig. 1 diagrammatically illustrates the invention applied to an electric motor for driving a phonograph disc;

Fig. 2 is a side elevation drawn to a large scale of the coupling forming a part of the invention;

Fig. 3 is a sectional view taken through the central portion of the coupling illustrated in Fig. 2; and Fig. 4 is a horizontal section of one of the opposed members.

Fig. 5 illustrates the ball or roller in its normal position in the recesses;

Fig. 6 illustrates the position of the ball or roller and displacement of the coupling sections when the ball or roller is forced up the inclined portions of the recesses;

Fig. 7 illustrates a roller in the recesses; and Fig. 8 illustrates a ball.

Referring now to Fig. 1, the rotary spindle 10 of the motor 11 has one member 25 of the coupling rigidly connected thereto. The worm wheel 13 and the member 30 of the coupling is freely journaled upon the spindle 10. The worm wheel engages with a worm mounted upon a shaft 14. The shaft 14 is supported in jeweled or other high quality bearings not shown. The shaft 14 has secured thereto a collar 15 to which the ends of a plurality of thin flat leaf springs 16 are attached. At the centers of the leaf springs 16 bob weights 17 are mounted and the other ends of the leaf springs 16 are attached to a collar 18 which is adapted to slide freely upon the shaft 14. The collar 18 carries a flange 19 rigidly secured thereto which is adapted to bear against a fixed or adjustable stop 20. The stop 20 may have a friction pad and may be mounted upon the base or frame 21 of a gramophone or the like. The shaft 14, springs 16, bob weights 17, flange 19 and stop 20 constitute a centrifugal frictional governor as used in gramophones or phonographs. The gramophone or phonograph turntable 40 is mounted at the top of the spindle 10.

Referring now to Figs. 2, 3 and 4 the coupling member 25 is rigidly secured to the spindle 10 by screw 26. In the upper radial face of the member 25 a plurality of recesses 27 are formed. The member 25 is also provided with a flange 28 having a plurality of holes 29 evenly disposed around its circumference.

A coupling member 30 is freely journaled upon the spindle 10. Recesses 31 are formed in the radial face of this member in positions corresponding to those of the recesses 27. The radius of curvature of the recesses 31 is substantially equal to the radius of curvature of the recesses 27. It will be noted that the recesses are elongated circumferentially.

Rollers which may be in the form of balls 32 or rollers 32' are interposed between the members 25 and 30 in the recesses 27 and 31. The radius of curvature of the balls or rollers is considerably less than the radius of curvature of the recesses as shown in Figs. 5 to 8. The combined depth of the recesses 27 and 31 is less than the diameter of the balls 32 so that the opposed faces of the members 25 and 30 are prevented by the balls from contacting with one another.

The tubular member 33 having a flange 34 is arranged about the coupling member 30 and adjustably secured thereto by screws 35 extending through slots 36. The tubular member 33 can thus be rotated through a small angle relative to the member 30 and clamped in a predetermined position on the member 30 by means of the screws 35. A plurality of holes are provided in the flange 34 corresponding in position to the holes 29 in the flange 28. Helical tensioned springs 37 may be hooked into the holes in the flange 34 and the holes in the flange 28 so that the coupling members 25 and 30 are constrained toward one another. The worm wheel 13 which is connected to the centrifugal frictional governor is rigidly secured to the member 30.

The tube 33 is preferably so adjusted in relation to the member 30 that when the torque transmitted to the governor through the worm wheel is substantially normal, the springs 37 are slightly oblique. The normal torque is thus to a large extent transmitted by the springs, which, when obliquely arranged, have a certain amount of torsional elasticity. The balls 32 normally rest in the deepest portion of the recesses 27 and 31. The balls however may, during the running of the motor, be constantly in motion responsive to irregularities introduced by the driving members. The non-linear elasticity including the balls and recesses is responsive not only to irregularities introduced by the motor but is responsive to reactions introduced by the movement of the speed governor.

It will be recognized from the foregoing that the contour of the recesses 27 and 31 is such as to permit variable circumferential displacement of the coupling members or sections on the rollers approximately to the extent of the elongation of curvature of the recesses. The extent of this circumferential displacement depends upon the amplitude of the irregularity causing the displacement. The contour of these recesses is also such as to cause an increase of the distance between the coupling members or sections when the rollers are forced up the incline portion of the recesses and consequently an increase in the stiffness characteristic of the springs as a result of the circumferential displacement. The normal position of the roller 32 or 32' in the recesses is shown in Fig. 5. The extreme circumferential displacement is shown in Fig. 6. This illustrates the position taken by the ball or roller in the recesses and the axial displacement of the coupling members.

It is found that all small irregularities in the action of the governor and small irregularities due to imperfections of the worm wheel and the like, or irregularities introduced by the driving motor, are adequately absorbed by the coupling described. The resilience is such as to absorb these irregularities and since the constraint increases rapidly with displacement no excessive displacements occur, when for example, a considerable load is placed upon the mechanism.

It will be appreciated that the above description is given by way of example only and that many modifications may be made without departing from the scope of the invention.

What is claimed is:

1. A coupling of variable non-linear elasticity for absorbing velocity variations in a driving mechanism comprising a drive shaft having one coupling member rigidly connected thereto and an opposed coupling member freely journaled thereon, coil springs interconnecting said coupling members on an oblique angle to produce torsional elasticity and bias said coupling members toward each other, a member adjustably connected to said freely journaled member for holding said springs, means to adjust said spring holding member to regulate the normal torsional elasticity of said springs and means to facilitate said adjustment and to vary the non-linear elasticity according to the amplitude of the irregularities, said means including corresponding elongated curved recesses in the opposed faces of said coupling members with rollers in said recesses, the recesses being of such contour as to permit relative circumferential displacement and cause axial displacement of said members responsive to velocity irregularities.

2. A coupling of variable non-linear elasticity for connecting a drive and drive shaft to a governor mechanism for controlling velocity irregularities comprising two opposed coupling members, one member rigidly connected to said shaft and the other freely journaled thereon, a tubular member adjustably connected to the coupling member which is freely journaled on said shaft, coil springs for torsionally biasing the coupling members toward each other but permitting axial displacement, means to adjust the position of said tubular member with relation to said freely journaled member to regulate the normal torsional elasticity of said springs and means to facilitate said adjustment and to vary the stiffness characteristic of said springs depending upon the amplitude of the irregularities, said means including corresponding elongated curved recesses in the opposed faces of said members with rollers in said recesses, the recesses being of such contour as to permit relative circumferential displacement and cause axial displacement of said members responsive to velocity irregularities.

CHARLES JOHN PERCIVAL SMALL.